No. 724,761. PATENTED APR. 7, 1903.
A. H. VAN PELT & W. A. LAUFMAN.
OIL BURNER.
APPLICATION FILED FEB. 18, 1902.
NO MODEL. 2 SHEETS—SHEET 2.

WITNESSES:
Henry Parker.
Mabel B. Bennetts.

INVENTORS
Ada H. Van Pelt
William A. Laufman
BY
Lincoln Sonntag
ATTORNEY.

UNITED STATES PATENT OFFICE.

ADA H. VAN PELT AND WILLIAM A. LAUFMAN, OF OAKLAND, CALIFORNIA, ASSIGNORS, BY DIRECT AND MESNE ASSIGNMENTS, TO SAID VAN PELT.

OIL-BURNER.

SPECIFICATION forming part of Letters Patent No. 724,761, dated April 7, 1903.

Application filed February 18, 1902. Serial No. 94,621. (No model.)

*To all whom it may concern:*

Be it known that we, ADA H. VAN PELT and WILLIAM A. LAUFMAN, citizens of the United States, residing at the city of Oakland, in the county of Alameda and State of California, have invented certain new and useful Improvements in Oil-Burners, of which the following is a specification.

This invention relates to an oil-burner, of metal, for cooking and heating purposes; and the objects of said invention are to provide such burner which is smokeless, odorless, and noiseless in operation and emits at the same time a great degree of heat and in which crude or distillate oil or gasolene may be used and the collection of carbon crystals at the mouths of the discharge-pipes is prevented. Besides, our burner can be used in any heating or cooking stove, range, furnace, open grate, or incubator with equal advantage, producing a light dancing blaze having great heat. When lighted, it commences to heat gradually, so that stoves and ranges are prevented from cracking from sudden expansion. The distribution of heat is uniform, so that warping or burning out of the burner at any point does not occur, and no strong draft being required for the same the heat is conserved and may be used for some time. The flame of the burner is clear and blue, and its length may be varied from three to eighteen inches, as occasion may require. The construction is so complete that it is free from smoke, odor, or noise. After fire is started from said burner in a cook-stove water can be boiled in three minutes, and the oven will be ready for baking in fifteen minutes. A moderate or intense fire, which remains fixed as may be desired, can be had by simply turning the valve leading from the reservoir supplying the burner with oil. When once lighted, the fire can be kept up for days and nights successively without attention, except to see that the supply of oil is not exhausted. When not needed, the flame can be instantly extinguished. The even degree of heat secured by the use of said burner makes it invaluable for baking purposes, as the fluctuating heat arising when wood or coal is used does not exist.

The invention consists of certain features of construction and combination of parts hereinafter described, and shown in the accompanying drawings, reference thereto being had, and more particularly pointed out in the appended claims.

Figure 1:
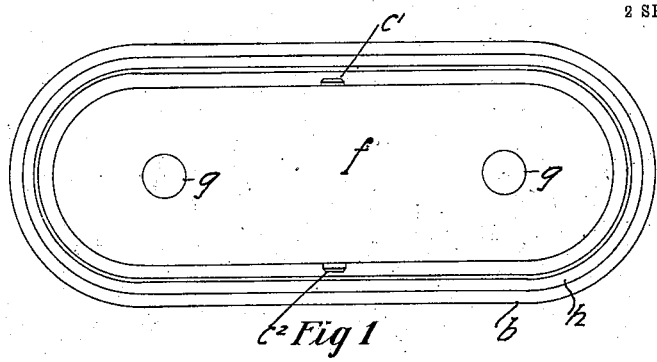
Figure 2:
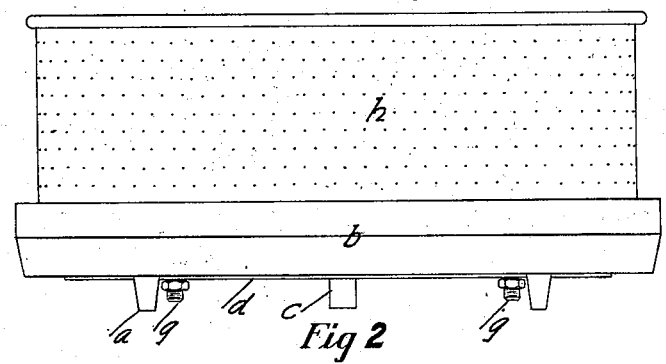
Figure 3:
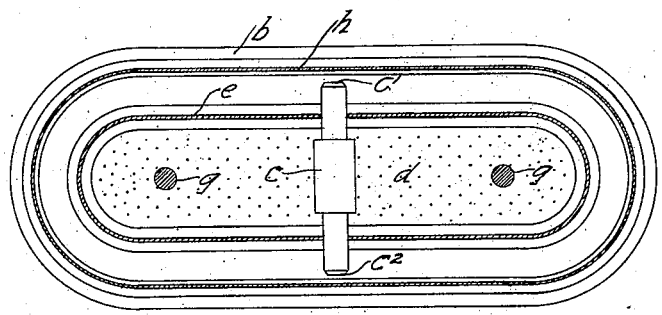
Figure 4:
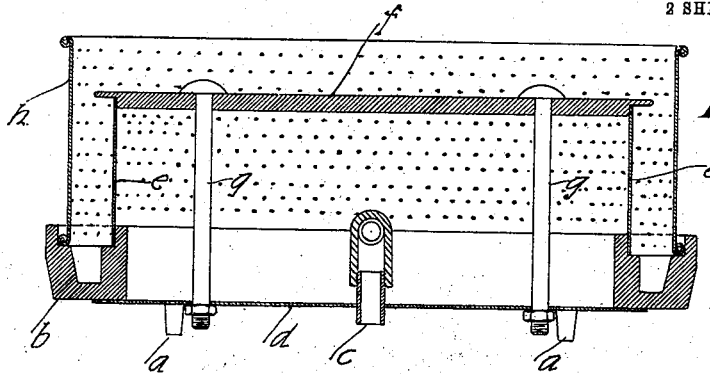
Figure 5:
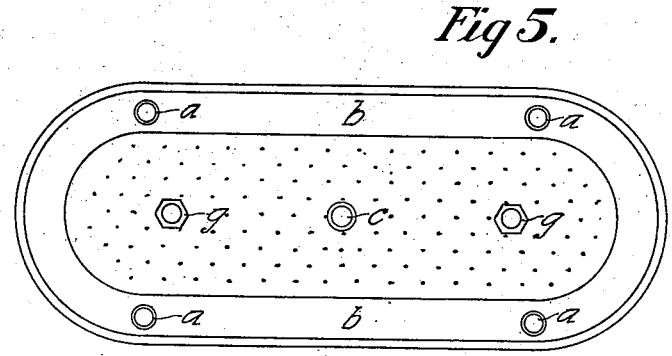
Figure 6:
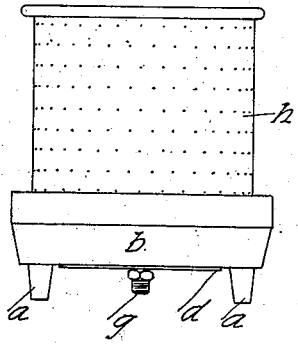
Figure 7:
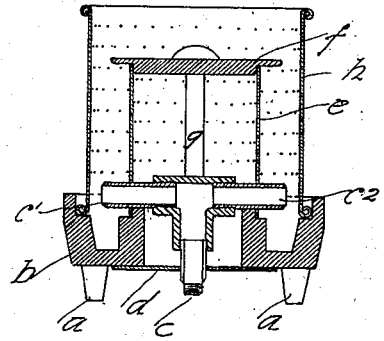

In the drawings, Figure 1 is a plan of the said burner looking down. Fig. 2 is a side view of the same. Fig. 3 is a horizontal section thereof. Fig. 4 is a vertical section of the same. Fig. 5 is a bottom view thereof. Fig. 6 is an end view of the same. Fig. 7 is a transverse section thereof.

In the drawings, $a$ represents a support of the said burner, and $b$ the trough, which is fed with oil through the T-pipe $c$, which is discharged at $c'$ and $c^2$, respectively. Beneath the body of the device and attached thereto is a perforated plate $d$, and the inner inclosing perforated wall is shown at $e$, the same being capped by plate $f$, having a projecting rim for spreading the flame arising from the trough when the said burner is in use, the same being held firmly in place by bolts $g$.

$h$ represents the outer inclosing perforated wall, which may be removed by lifting it from the groove in the trough in which it rests, as shown.

A pipe leading from a can or reservoir containing oil should be connected with said burner at $c$, the flow of the liquid being controlled by a valve near the connection. Air entering the bottom of the burner penetrates the inner wall and, uniting with the air coming through the outer wall, furnishes sufficient oxygen to make a perfect blue flame, and consequently a great degree of heat. The collection of carbon crystals at the mouths of the discharge-pipes $c'$ and $c^2$ is prevented by making them sufficiently large, as we have done.

Having thus described our invention, what we claim as new, and desire to secure by Letters Patent, is—

1. In a wickless and portable oil-burner an open trough connected with a perforated base-plate, an inner perforated wall and an outer removable perforated wall in combination with a centrally-fed pipe with branches for conducting oil into said trough and a cap covering said inner wall and having a projecting rim for spreading the flame arising from burning oil in said trough substantially as described.

2. In a wickless and portable oil-burner an open trough connected to a perforated base-plate an inner and permanent perforated wall an outer removable perforated wall, the base of the latter wall resting in a groove in said trough in combination with a cap covering said inner wall and having a projecting rim for spreading the flame arising from burning oil in said trough and means for conducting oil into said trough substantially as described.

3. In a wickless and portable oil-burner a perforated base-plate with legs attached thereto, an oblong continuous open trough resting thereon, an inner perforated wall resting thereon, an inner groove in said trough, an outer perforated wall resting on an outer groove in said trough in combination with a cover on said inner wall having a perforated rim for spreading the flame arising from burning oil in said trough and means for conducting oil into said trough substantially as described.

4. In a wickless and portable oil-burner a mounted perforated plate having a channeled rim forming a trough, said trough being open and having near its mouth an inner and an outer groove, in combination with an inner continuous perforated wall, covered with a cap having an outwardly-projecting rim resting in said inner groove, an outer perforated wall surrounding said inner wall and resting in said outer groove, a centrally-positioned pipe penetrating said plate and having horizontal branches for conducting oil into said trough substantially as described.

5. In a wickless and portable oil-burner a mounted perforated plate upwardly connected at its rim to a continuous open trough, an encircling inner perforated wall resting on the inner side of said trough and an outer removable perforated wall resting on but not connected to the outer side of said trough and surrounding said inner wall in combination with a cap covering said inner wall and having an outwardly-projecting rim not in contact with said outer wall, inwardly-conducting and outwardly-flowing pipes for discharging oil into said trough and means for preventing the destruction of said discharge-pipes substantially as described.

In testimony whereof we affix our signatures in presence of two witnesses.

ADA H. VAN PELT.
WILLIAM A. LAUFMAN.

Witnesses:
HENRY PARKER,
JOHN T. BRADLEY.